United States Patent [19]
Yoshida et al.
[11] 4,268,604
[45] May 19, 1981

[54] PHOTOGRAPHIC ELEMENT FOR COLOR DIFFUSION TRANSFER PROCESS

[75] Inventors: Takashi Yoshida; Shinji Sakaguchi, both of Minami-ashigara, Japan
[73] Assignee: Fuji Photo Film Co., Ltd., Minami-ashigara, Japan

[21] Appl. No.: 31,724
[22] Filed: Apr. 19, 1979
[30] Foreign Application Priority Data
Apr. 19, 1978 [JP] Japan ................................ 53-46247
[51] Int. Cl.[3] ........................ G03C 1/40; G03C 5/54; B32B 27/08; B32B 27/00
[52] U.S. Cl. .................................. 430/215; 428/500; 428/515; 428/520; 428/521; 428/522; 430/404; 430/463; 430/644
[58] Field of Search .................... 96/77, 29 D, 119 R, 96/76 R; 428/522, 521, 515, 520, 500; 430/215, 404, 463, 644

[56] References Cited
U.S. PATENT DOCUMENTS
4,056,394 11/1977 Hannie .................................. 96/77
4,061,496 12/1977 Hannie et al. .......................... 96/77

*Primary Examiner*—Richard L. Schilling
*Attorney, Agent, or Firm*—Sughrue, Rothwell, Mion, Zinn and Macpeak

[57] ABSTRACT

In a photographic element for the color diffusion transfer process including a neutralizing system for reducing the pH of an aqueous alkaline developing solution which comprises a neutralizing layer and a timing layer wherein the timing layer is positioned on or under the neutralizing layer in direct or indirect contact therewith such that the aqueous alkaline developing solution reaches the neutralizing layer through the timing layer, the improvement which comprises said timing layer comprising a mixture of at least one polymer latex the minimum film forming temperature of which is 35° C. or less (Group I) and at least one polymer latex the minimum film forming temperature of which is more than 35° C. (Group II), each polymer latex being produced by emulsion polymerization of each of at least one monomer selected from the group consisting of monomers of Group (A) described below and at least one monomer selected from the group consisting of monomers of Group (B) described below, or each of at least one monomer selected from the group consisting of monomers of Group (A) described below, at least one monomer selected from the group consisting of monomers of Group (B) described below and at least one monomer selected from the group consisting of monomers of Group (C) described below:

Group (A): ethylene-type monomers having at least a free carboxylic acid group, a free sulfonic acid group or a free phosphoric acid group or a salt thereof, Group (B): monomers represented by the following general formula (M):

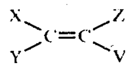

(M)

wherein X and Y, which may be the same or different, each represents a hydrogen atom, a methyl group, a halogen atom or a $-COOR^1$ group; Z represents a hydrogen atom, a methyl group, a halogen atom or a $-(CH_2)_nCOOR^2$ group; V represents an aryl group, a $-COOR^3$ group or a

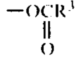

group; $R^1$, $R^2$ and $R^3$, which may be the same or different, each represents an aliphatic group or an aryl group; and n represents an integer of 0 to 3, Group (C): monofunctional or polyfunctional unsaturated monomers other than those monomers described in Group (A) and Group (B) above which are copolymerizable with the monomers described in Group (A) and Group (B) above and selected from the group consisting of acrylamides, methacrylamides, vinyl ethers, vinyl ketones, allyl compounds, vinyl heterocyclic compounds, unsaturated nitriles and polyfunctional monomers, and the polymer latex layer per se is water permeable.

33 Claims, No Drawings

PHOTOGRAPHIC ELEMENT FOR COLOR DIFFUSION TRANSFER PROCESS

BACKGROUND OF THE INVENTION

1. Field of the Invention

The present invention relates to a photographic element having a neutralizing system for a color diffusion transfer process (DTR color) and particularly to a photographic element for DTR color comprising a novel timing layer.

2. Description of the Prior Art

Hitherto, it is well known in the color diffusion transfer process to provide a neutralizing layer in order to decrease the pH after transferring diffusible dyes or dye developing agents to a mordanting layer as a result of development using an aqueous alkaline developing solution.

However, if the pH is rapidly decreased by providing a neutralizing layer, the development is interrupted. In order to prevent such a defect, it is also well known to utilize a layer which controls the reduction of the pH with time, namely a "timing layer", together with the neutralizing layer.

A neutralizing system containing these layers can be divided into two types, one type having a timing layer in which the water permeability is inversely proportional to the temperature and the other type having a timing layer in which the water permeability is directly proportional to the temperature.

The term "water permeability" used herein means the property of substantially passing an aqueous alkaline developing solution therethrough. More specifically, when a pH indicator (Thymolphthalein) coating film as described in Example 3 hereinafter is placed face-to-face with a timing layer on a neutralizing layer and an alkaline viscous solution is spread between them, where the pH indicator coating film becomes colorless, the timing layer is defined as being water permeable.

In using a timing layer in which the water permeability is inversely proportional to the temperature, the period of time at a high pH (preferably, a pH of about 10 or more) for developing silver halide and forming an imagewise distribution of diffusible dyes increases as the temperature increases. A neutralizing system having a timing layer which is temperature dependent is fundamentally suggested in British Pat. No. 1,071,087. Further, materials for the timing layer include polyvinyl amide type polymers described in U.S. Pat. Nos. 3,421,893 and 3,575,701. A neutralizing system having a timing layer wherein the above-described materials are used where the period of time at high pH increases as the temperature increases is advantageously utilized for the color diffusion transfer process which has the disadvantages that the development rate or the diffusion rate of the dye developing agent is high and excessive amounts of dyes are adsorbed in the mordanting layer at low temperatures, such as the color diffusion transfer process described in U.S. Pat. Nos. 2,983,606, 3,415,644 and 3,415,645.

On the other hand, a neutralizing system having a timing layer in which the water permeability is directly proportional to the temperature where the above-described period of time at a high pH decreases as the temperature increases is advantageously utilized for the color diffusion transfer process which uses dye image forming materials which are not diffusible initially but release a diffusible dye as a result of an oxidation-reduction reaction or a coupling reaction thereof with an oxidation product of the developing agent (hereinafter, materials of the former type are called "DRR compounds" and materials of latter type are called "DDR couplers") as described in U.S. Published Application B351,673, U.S. Pat. Nos. 3,929,760, 3,931,144 and 3,932,381. Namely, the delay of the development of silver halide and the delay of the above-described oxidation-reduction reaction at a low temperature and the deterioration of densities of transferred color images caused by the delay of the diffusion of dyes can be corrected by prolonging the period of time at high pH (namely, prolonging the period of time where developing of silver halide and releasing and transferring of the dyes can occur).

Examples of timing layers where the water permeability increases as the temperature increases are timing layers composed of polyvinyl alcohol as described in U.S. Pat. No. 3,362,819, layers described in U.S. Pat. No. 3,785,815, layers described in *Research Disclosure,* p. 86 (November 1976) and U.S. Pat. Nos. 4,056,394 and 4,061,496 (namely, timing layers formed from a latex of methyl acrylate-vinylidene chloride-itaconic acid copolymers or acrylonitrile-vinylidene chloride-acrylic acid copolymers), layers composed of a latex of styrene-butyl acrylate-acrylic acid copolymer as described in Japanese Patent Application (OPI) 72622/78 (The term "OPI" as used herein refers to a "published unexamined Japanese patent application") and layers composed of a latex of styrene-butyl acrylate-acrylic acid-glycidyl acrylate copolymers as described in U.S. Pat. Application Ser. No. 966,407.

However, in the timing layers described in U.S. Pat. No. 3,785,815, the delay in development cannot be sufficiently compensated for, because the degree of the decrease in water permeability in the low temperature range is small. Where the timing layers described in *Research Disclosure,* supra on U.S. Pat. Nos. 4,056,394 and 4,061,496 are used, the delay in development can be sufficiently compensated for, because the water permeability in the low temperature range can be sufficiently delayed. However, since these timing layers are produced by coating polymer latexes and drying, the difficulties which polymer latexes inherently have are encountered in the production of these timing layers. That is, in order to obtain a transparent layer from a polymer latex, it is necessary to dry a polymer latex layer coated at a temperature above a minimum film forming temperature which is determined depending on the softening temperature of polymer particles which compose the polymer latex layer. Therefore, the use of polymer latex which has a low minimum film forming temperature is desired in order to economize cost of fuel in the production of a timing layer. However, when a polymer latex having a low minimum film forming temperature is used, due to the low softening point of the polymer, the timing layer causes blocking between the timing layer and a back surface of the film when the film having the timing layer is rolled or the timing layer causes a blocking defect between the timing layer and a surface of a light-sensitive film after the formation of a DTR color photographic film unit. Thus, a timing layer should be produced using a polymer latex having a high minimum film forming temperature (a high softening temperature) in order to prevent such blocking defects. Where a polymer latex having a high softening temperature is used, a method of drying at a high temperature or a method in which a solvent being capable of dissolving to some extent the polymer is admixed with the polymer latex and drying is carried out at a low temperature with the assistance of a film formation accelerating effect of the solvent used (the solvent used is designated "film formation assisting solvent" hereinafter) are well known in the polymer latex field. However, in the former method the cost of fuel for drying is high and in the latter method a hazardous vapor is generated during the manufacture thereof because of using the solvent and the cost of production increases for the solvent.

SUMMARY OF THE INVENTION

An object of the present invention is to provide a photographic element for DTR color having a timing layer which is produced using a polymer latex having a high minimum film forming temperature and dried at a low temperature without using a film formation assisting solvent and which is free from the blocking defects described above.

The above-described object of the present invention can be attained effectively by using a timing layer which is formed by mixing at least one polymer latex the minimum film forming temperature of which is 35° C. or less (Group I) and at least one polymer latex the minimum film forming temperature of which is more than 35° C. (Group II) and each of the polymer latexes is produced by emulsion polymerization of each of at least one monomer selected from the group consisting of monomers of Group (A) described below and at least one monomer selected from the group consisting of monomers of Group (B) described below, or each of at least one monomer selected from the group consisting of monomers of Group (A) described below, at least one monomer selected from the group consisting of monomers of Group (B) described below and at least one monomer selected from the group consisting of monomers of Group (C) described below:

Group (A): ethylene-type monomers having at least a free carboxylic acid group, a free sulfonic acid group or a free phosphoric acid group or a salt thereof, Group (B): monomers represented by the following general formula (M):

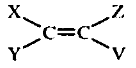

(M)

wherein X and Y, which may be the same or different, each represents a hydrogen atom, a methyl group, a halogen atom or a —$COOR^1$ group; Z represents a hydrogen atom, a methyl group, a halogen atom or a —$(CH_2)_nCOOR^2$ group; V represents a monocyclic or bicyclic aryl group having 6 to 12 carbon atoms, a —$COOR^3$ group or an

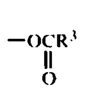

group; $R^1$, $R^2$, and $R^3$, which may be the same or different, each represents an aliphatic group or an aryl group; and n represents an integer of 0 to 3, Group (C): monofunctional or polyfunctional unsaturated monomers other than those monomers described in Group (A) and Group (B) above which are copolymerizable with the monomers described in Group (A) and Group (B) above and selected from the group consisting of acrylamides, methacrylamides, vinyl ethers, vinyl ketones, allyl compounds, vinyl heterocyclic compounds, unsaturated nitriles and polyfunctional monomers, and coating, and the polymer layer per se is water permeable, as the timing layer in a photographic element for the color diffusion transfer process which has a neutralizing system for decreasing the pH of an aqueous alkaline developing solution where the neutralizing system comprises a neutralizing layer and a timing layer, and wherein the timing layer is positioned on or under the neutralizing layer in direct or indirect contact therewith in such a relation that the developing solution reaches the neutralizing layer through the timing layer.

DETAILED DESCRIPTION OF THE INVENTION

The aliphatic group and the aryl group for $R^1$ to $R^3$ described above include substituted and unsubstituted aliphatic groups and substituted and unsubstituted aryl groups. Examples of the substituents for the aliphatic and aryl groups are a halogen atom (for example, chlorine, bromine, fluorine), a hydroxy group, an alkoxy group (preferably an alkoxy group having 1 to about 3 carbon atoms), a furyl group, a tetrahydrofuryl group, an aryl group having 6 to 12 carbon atoms (for example, a phenyl group, a substituted phenyl group (examples of the substituents are an alkyl group (such as a methyl group), a halogen atom (such as chlorine, bromine, fluorine), etc.), a sulfo group, an amino group (for example, N-ethyl-N-phenylamino group), an aryloxy group having 6 to 12 carbon atoms (for example, dimethylaminophenoxy group), an aliphatic or aromatic acyloxy group having 2 to 7 carbon atoms (for example, acetoxy group, acetoacetoxy group), and the like.

The aliphatic group may be an alkyl group having 1 to 12 carbon atoms, preferably 1 to 6 carbon atoms, most preferably 1 to 4 carbon atoms (e.g., a methyl group, an ethyl group, an n-propyl group, an isobutyl group, an n-pentyl group, an n-hexyl group, a nonyl group, a dodecyl group, etc.). The aryl group may be a substituted or an unsubstituted monocyclic or bicyclic aryl group having 6 to 12 carbon atoms (e.g., a phenyl group, a 1-naphthyl group, a 2-naphthyl group, a p-methylphenyl group, a p-chlorophenyl group, etc.).

Specific examples of the monomers of Group (A) include the following monomers: acrylic acid, methacrylic acid, itaconic acid, maleic acid, monoalkyl itaconates (for example, monomethyl itaconate, monoethyl itaconate or monobutyl itaconate, etc.), monoalkyl maleates (for example, monomethyl maleate, monoethyl maleate, monobutyl maleate or monooctyl maleate, etc.), citraconic acid, styrenesulfonic acid, vinylbenzylsulfonic acid, vinylsulfonic acid, acryloyloxyalkyl sulfonic acids (for example, acryloyloxymethyl sulfonic acid, acryloyloxyethyl sulfonic acid, acryloyloxypropyl sulfonic acid, acryloyloxybutyl sulfonic acid and acryloyloxyethoxybutyl sulfonic acid, etc.), methacryloyloxyalkyl sulfonic acids (for example, methacryloyloxymethyl sulfonic acid, methacryloyloxyethyl sulfonic acid, methacryloyloxypropyl sulfonic acid, methacryloyloxybutyl sulfonic acid and methacryloyloxyethoxybutyl sulfonic acid, etc.), acrylamido alkylalkane sulfonic acids (for example, 2-acrylamido-2-methylethanesulfonic acid, 2-acrylamido-2-methylpropanesulfonic acid and 2-acrylamido-2-methylbutanesulfonic acid, etc.), methacrylamido alkylalkane sulfonic acids (for example, 2-methacrylamido-2-methylethanesulfonic acid, 2-methacrylamido-2-methylpropanesulfonic acid and 2-methacrylamido-2-methylbutanesulfonic acid, etc.), acryloyloxyalkyl phosphates (for example, acryloyloxyethyl phosphate and 3-acryloyloxypropyl-2-phosphate, etc.) and methacryloyloxyalkyl phosphates (for example, methacryloyloxyethyl phosphate and 3-methacryloyloxypropyl-2-phosphate, etc.), etc.

These acids may also be in the form of the alkali metal salts thereof (preferably, sodium salts or potassium salts) or the ammonium salts thereof.

Examples of the monomers of Group (B) include monomers such as acrylic acid esters, methacrylic acid esters, crotonic acid esters, vinyl esters, maleic acid diesters, fumaric acid diesters, itaconic acid diesters, olefins and styrenes, etc.

Further, specific examples of these Group (B) monomers include:

acrylic acid esters such as methyl acrylate, ethyl acrylate, n-propyl acrylate, isopropyl acrylate, n-butyl acrylate, isobutyl acrylate, sec-butyl acrylate, amyl acrylate, hexyl acrylate, 2-ethylhexyl acrylate, octyl acrylate, tert-octyl acrylate, 2-phenoxyethyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-isopropoxyethyl acrylate, 2-butoxyethyl acrylate, 2-(2-methoxyethoxy)ethyl acrylate, 2-(2-butoxyethoxy)ethyl acrylate, ω-methoxypolyethylene glycol acrylate (mean polymerization degree of polyethylene glycol is about 9), 1-bromo-2-methoxyethyl acrylate, 1,1-dichloro-2-ethoxyethyl acrylate;

methacrylic acid esters such as methyl methacrylate, ethyl methacrylate, n-propyl methacrylate, isopropyl methacrylate, n-butyl methacrylate, isobutyl methacrylate, secbutyl methacrylate, amyl methacrylate, hexyl methacrylate, cyclohexyl methacrylate, benzylmethacrylate, chlorobenzyl methacrylate, octyl methacrylate, sulfopropyl methacrylate, N-ethyl-N-phenylaminoethyl methacrylate, 2-(3-phenylpropyloxy)ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, 2-hydroxyethyl methacrylate, 2-hydroxypropyl methacrylate, 4-hydroxybutyl methacrylate, triethyleneglycol monomethacrylate, dipropyleneglycol monomethacrylate, 2-methoxyethyl methacrylate, 3-methoxybutyl methacrylate, 2-acetoxyethyl methacrylate, acetoacetoxyethyl methacrylate, 2-ethoxyethyl methacrylate, 2-isopropoxyethyl methacrylate, 2-butoxyethyl methacrylate, 2-(2-methoxyethoxy)ethyl methacrylate, 2-(2-ethoxyethoxy)ethyl methacrylate, 2-(2-butoxyethoxy)ethyl methacrylate, ω-methoxypolyethylene glycol methacrylate (mean polymerization degree of polyethylene glycol is about 6);

vinyl esters such as vinyl acetate, vinyl propionate, vinyl butyrate, vinyl isobutyrate, vinyl dimethylpropionate, vinyl ethylbutyrate, vinyl valerate, vinyl caproate, vinyl chloroacetate, vinyl dichloroacetate, vinyl methoxyacetate, vinyl butoxyacetate, vinyl phenylacetate, vinyl acetoacetate, vinyl lactate, vinyl β-phenylbutyrate, vinyl cyclohexylcarboxylate, vinyl benzoate, vinyl salicylate, vinyl chlorobenzoate, vinyl tetrachlorobenzoate, vinyl naphthoate;

olefins such as dicyclopentadiene, ethylene, propylene, 1-butene, 1-pentene, ethylene fluoride, vinyl chloride, vinylidene chloride, vinylidene bromide, isoprene, chloroprene, butadiene, 1-hexene, 4-methyl-1-pentene, 1-heptene, 1-octene, 1-decene, 5-methyl-1-nonene, 5,5-dimethyl-1-octene, 4-methyl-1-hexene, 4,4-dimethyl-1-pentene, 5-methyl-1-hexene, 4-methyl-1-heptene, 5-methyl-1-heptene, 4,4-dimethyl-1-hexene, 5,6,6-trimethyl-1-heptene, 1-dodecene and 1-octadecene;

styrenes such as styrene, methylstyrene, dimethylstyrene, trimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene, vinylbenzoic acid methyl ester;

crotonic acid esters such as butyl crotonate, hexyl crotonate, glycerin monocrotonate;

itaconic acid diesters such as dimethyl itaconate, diethyl itaconate, dibutyl itaconate;

maleic acid diesters such as diethyl maleate, dimethyl maleate, dibutyl maleate;

fumaric acid diesters such as diethyl fumarate, dihexyl fumarate and dibutyl fumarate, etc.

Specific examples of the monomers of Group (C) include the following monomers:

acrylamides such as methylacrylamide, ethylacrylamide, propylacrylamide, isopropylacrylamide, butylacrylamide, tert-butylacrylamide, heptylacrylamide, tert-octylacrylamide, cyclohexylacrylamide, benzylacrylamide, hydroxymethylacrylamide, methoxyethylacrylamide, dimethylaminoethylacrylamide, hydroxyethylacrylamide, phenylacrylamide, hydroxyphenylacrylamide, tolylacrylamide, napthylacrylamide, dimethylacrylamide, diethylacrylamide, dibutylacrylamide, diisobutylacrylamide, N-(1,1-dimethyl-3-oxobutyl)acrylamide, methylbenzylacrylamide, benzyloxyethylacrylamide, β-cyanoethylacrylamide, acryloylmorpholine, N-methyl-N-acryloylpiperazine, N-acryloylpiperidine, N-acryloylglycine, N-(1,1-dimethyl-3-hydroxybutyl)acrylamide, N-β-morpholinoethylacrylamide, N-acryloylhexamethyleneimine, N-hydroxyethyl-N-methylacrylamide, N-2-acetoamidoethyl-N-acetylacrylamide and acrylhydrazine, etc.;

methacrylamides such as methylmethacrylamide, tert-butylmethacrylamide, tert-octylmethacrylamide, benzylmethacrylamide, cyclohexylmethacrylamide, phenylmethacrylamide, dimethylmethacrylamide, diethylmethacrylamide, dipropylmethacrylamide, hydroxyethyl-N-methylmethacrylamide, N-methyl-N-phenylmethacrylamide, N-ethyl-N-phenylmethacrylamide and methacrylhydrazine, etc.;

allyl compounds such as allyl acetate, allyl caproate, allyl caprylate, allyl laurate, allyl palmitate, allyl stearate, allyl benzoate, allyl acetoacetate, allyl lactate, allyloxyethanol, allyl butyl ether and allyl phenyl ether, etc.;

vinyl ethers such as methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether and dimethylaminoethyl vinyl ether, etc.;

vinyl ketones such as methyl vinyl ketone, phenyl vinyl ketone and methoxyethyl vinyl ketone, etc.;

vinyl heterocyclic compounds such as N-vinyloxazolidone, vinylpyridine, vinylpicoline, N-vinylimidazole, N-vinyl-2-methylimidazole, N-vinyltriazole, N-vinyl-3,5-dimethyltriazole, N-vinylpyrrolidone, N-vinyl-3,5-dimethylpyrazole, N-vinylcarbazole, vinylthiophene, N-vinylsuccinimide, N-vinylglutarimide, N-vinylalipinimide, N-methyl-N-vinylformamide, N-ethyl-N-vinylformamide, N-methyl-N-vinylacetamide, N-ethyl-N-vinylacetamide, N-methyl-N-vinylpropionamide, N-vinylpyrrolidone, N-vinylpiperidone, N-vinyl-δ-caprolactam and N-vinyl-2-pyridone, etc., and glycidyl esters (for example, glycidyl acrylate, glycidyl methacrylate, glycidyl p-vinylbenzoate, glycidyl crotonate, glycidyl α-chloroacrylate, glycidyl itaconate, glycidyl methylene malonate, glycidyl maleate, etc.) or precursors thereof (for example, 2-hydroxy-3-chloropropyl acrylate, 2-hydroxy-3-chloropropyl methacrylate, etc.);

unsaturated nitriles such as acrylonitrile and methacrylonitrile, etc.;

polyfunctional monomers such as divinylbenzene, diallylphthalate, methylene bisacrylamide, ethylene glycol dimethacrylate, ethylene glycol diacrylate, trimethylolpropane triacrylate and pentaerythritol trimethacrylate, etc.

Of these monomers, acrylic acid, methacrylic acid, itaconic acid and 2-methacryloyloxyethyl phosphate are preferred as the monomers of Group (A), and acrylic acid esters, methacrylic acid esters, olefins and styrenes are preferred as the monomers of Group (B) from the standpoint of hydrophilic property, hydrophobic property and polymerization reactivity of the monomer, and stability and film forming ability of the polymer latex formed therefrom, etc.

The ratio of monomer components in the copolymers of the polymer latex can be appropriately changed depending on the characteristics desired for the neutralizing system in which the polymer latex is used. When the ratio of the Group (A) monomer component increases, the water permeability of the layer formed using the latex increases. A preferred amount of the Group (A) monomer component is in the range of about $0.1\times10^{-3}$ to $2.2\times10^{-3}$ mol, more particularly about $0.4\times10^{-3}$ to $1.0\times10^{-3}$ mol per 1 g of the solid content of the latex polymer. A preferred amount of the Group (B) monomer component is about 50 to 99% by weight, particularly about 80 to 99% by weight, based on the total weight of the polymer. A preferred amount of the Group (C) monomer component is about 0 to 49% by weight, particularly 0 to 19% by weight, based on the total weight of the polymer.

The ratio of the monomer components described herein is based on the relative ratio of monomers used in the conventional free radical polymerization process. The ratio of the monomer components in the polymers which are produced by emulsion polymerization using the conventional free radical polymerization process may vary from the ratio of the monomer components used to some extent for the reasons which are well known by the skilled artisan.

The minimum film forming temperature of the polymer latex used in the present invention is determined by the monomers to be used and the ratio of the monomers. The monomers which are particularly useful to compose polymer latexes used in the present invention and the critical ratio of the monomers (% by weight) by which the polymer latexes of Group (I) or Group (II) are reliably produced are shown in Tables 1 and 2 below. The values shown in Tables 1 and 2 are applicable to most cases in which other monomers are used as long as the monomers are selected from Group (A) monomers, Group (B) monomers and Group (C) monomers.

TABLE 1

The ratio of monomers necessary to compose polymer latex of Group (I) for typical monomers (per total monomers)

| No. | Monomer | Ratio of monomers necessary to compose polymer latex of Group (I) (% by weight) | Remarks |
|---|---|---|---|
| 1 | n-Butyl Acrylate | 36% or more | as (B) group monomer |
| 2 | Methyl Acrylate | 65% or more | as (B) group monomer |
| 3 | Ethyl Acrylate | 43% or more | as (B) group monomer |
| 4 | n-Propyl Acrylate | 37% or more | as (B) group monomer |
| 5 | sec-Butyl Acrylate | 45% or more | as (B) group monomer |
| 6 | n-Butyl Methacrylate | 77% or more | as (B) group monomer |
| 7 | Methoxyethyl Acrylate | 38% or more | as (C) group monomer |
| 8 | Ethoxyethyl Acrylate | 36% or more | as (C) group monomer |

TABLE 2

The ratio of monomers necessary to compose polymer latex of Group (II) for typical monomers (per total monomers)

| No. | Monomer | Ratio of monomers necessary to compose polymer latex of Group (II) (% by weight) | Remarks |
|---|---|---|---|
| 1 | Styrene | 65% or more | as (B) group monomer |
| 2 | Methyl Methacrylate | 69% or more | as (B) group monomer |
| 3 | t-Butyl Methacrylate | 68% or more | as (B) group monomer |
| 4 | Ethyl Methacrylate | 80% or more | as (B) group monomer |
| 5 | Phenyl Methacrylate | 68% or more | as (B) group monomer |
| 6 | Benzyl Methacrylate | 93% or more | as (B) group monomer |
| 7 | Vinyl Toluene | 72% or more | as (B) group monomer |
| 8 | Vinylidene Chloride | 92% or more | as (B) group |

TABLE 2-continued

| The ratio of monomers necessary to compose polymer latex of Group (II) for typical monomers (per total monomers) | | | |
|---|---|---|---|
| No. | Monomer | Ratio of monomers necessary to compose polymer latex of Group (II) (% by weight) | Remarks |
| 9 | Tetrahydrofurfuryl Methacrylate | 85% or more | monomer as (C) group monomer |

Typical examples of preferred polymer latexes of Group (I) and Group (II) are illustrated below, but the present invention is not to be construed as being limited to these examples. All ratios are by weight and based on the amount of monomer used in the free radical polymerization process.

| Polymer Latexes of Group (I) | | |
|---|---|---|
| I-1 | n-Propylacrylate/acrylic acid copolymer | (96:4) |
| I-2 | n-Butylmethacrylate/acrylic acid copolymer | (97.5:2.5) |
| I-3 | n-Butylmethacrylate/acrylic acid copolymer | (96:4) |
| I-4 | sec-Butylmethacrylate/acrylic acid copolymer | (97:3) |
| I-5 | n-Butylmethacrylate/itaconic acid copolymer | (97.5:2.5) |
| I-6 | n-Butylmethacrylate/itaconic acid copolymer | (96:4) |
| I-7 | 2-Acetoxyethylmethacrylate/acrylic acid copolymer | (97:3) |
| I-8 | Ethylacrylate/methacrylic acid copolymer | (90:10) |
| I-9 | Benzylacrylate/acrylic acid copolymer | (96:4) |
| I-10 | Phenylacrylate/acrylic acid copolymer | (97:3) |
| I-11 | n-Butylmethacrylate/maleic acid copolymer | (99:1) |
| I-12 | n-Butylmethacrylate/sodium vinylbenzylsulfonate copolymer | (91:9) |
| I-13 | Ethylacrylate/2-acrylamido-2-methylpropanesulfonic acid copolymer | (93:7) |
| I-14 | n-Propylacrylate/2-methacryloyloxyethylphosphate copolymer | (92:8) |
| I-15 | n-Butylmethacrylate/ethylmonoitaconate copolymer | (93:7) |
| I-16 | sec-Butylmethacrylate/2-methacryloyloxyethylphosphate copolymer | (91:9) |
| I-17 | Styrene/butylacrylate/acrylic acid copolymer | (52.8:43.2:4) |
| I-18 | Styrene/butylacrylate/acrylic acid copolymer | (51.8:42.2:6) |
| I-19 | Styrene/ethoxyethylacrylate/acrylic acid copolymer | (48:48:4) |
| I-20 | Styrene-butylacrylate/itaconic acid copolymer | (48:48:4) |
| I-21 | Styrene/butylacrylate/methacrylic acid copolymer | (46:46:8) |
| I-22 | Styrene/ethylacrylate/2-acrylamido-2-methylpropane-sulfonic acid copolymer | (40:50:10) |
| I-23 | Methylmethacrylate/butylmethacrylate/itaconic acid copolymer | (10:85:5) |
| I-24 | Benzylmethacrylate/2-ethylhexylacrylate/acrylic acid copolymer | (60:35:5) |
| I-25 | Phenylmethacrylate/butylacrylate/sodium 2-methacryloyloxy-ethylsulfonate copolymer | (55:40:5) |
| I-26 | Ethylmethacrylate/2-acetoxyethylmethacrylate/acrylic acid copolymer | (30:64:6) |
| I-27 | Butylmethacrylate/2-hydroxyethylmethacrylate/acrylic acid copolymer | (90:5:5) |
| I-28 | n-Butylmethacrylate/acrylic acid/2-acrylamido-2-methyl-propanesulfonic acid copolymer | (92:4:4) |
| I-29 | Benzylmethacrylate/vinylacetate/sodium 2-methacryloyloxy-propanesulfonate copolymer | (30:63:7) |
| I-30 | Ethylmethacrylate/vinylbutylate/acrylic acid copolymer | (50:46:4) |
| I-31 | Vinyltoluene/ethoxyethylacrylate/acrylic acid copolymer | (53:43:4) |
| I-32 | Styrene/dibutylmaleate/maleic acid copolymer | (50:47:3) |
| I-33 | n-Butylmethacrylate/dimethylacrylamide/acrylic acid copolymer | (70:25:5) |
| I-34 | Cyclohexylmethacrylate/N-(1,1-dimethyl-3-oxobutyl)-acrylamide/acrylic acid copolymer | (60:36:4) |
| I-35 | n-Butylmethacrylate/tert-butylacrylamide/acrylic acid | |

-continued

| | | |
|---|---|---|
| | copolymer | (70:26:4) |
| I-36 | n-Butylmethacrylate/acrylonitrile/methacrylic acid copolymer | (80:12:8) |
| I-37 | n-Butylmethacrylate/ethylene glycol dimethacrylate/ acrylic acid copolymer | (92:3:5) |
| I-38 | Styrene/butylacrylate/divinylbenzene/acrylic acid copolymer | (50:42:3:5) |
| I-39 | Tetrahydrofurfurylmethacrylate/ethylacrylate/ethylene glycol dimethacrylate/itaconic acid copolymer | (52:50:4:4) |
| I-40 | Hexylmethacrylate/tert-butylacrylamide/methylenebis-acrylamide/2-acrylamido-2-methylpropanesulfonic acid copolymer | (62:26:3:9) |
| I-41 | Styrene/butadiene/acrylic acid copolymer | (47:50:3) |
| I-42 | Vinylidene chloride/methylacrylate/acrylic acid copolymer | (85:12:3) |
| I-43 | Vinylidene chloride/methylacrylate/acrylic acid copolymer | (85:13:2) |
| I-44 | Vinylidene chloride/methylacrylate/acrylic acid copolymer | (90:8.5:1.5) |
| I-45 | Vinylidene chloride/methylacrylate/acrylic acid copolymer | (90:9:1) |
| I-46 | Vinylidene chloride/methylacrylate/acrylic acid copolymer | (90:9.5:0.5) |
| I-47 | Vinylidene chloride/butylacrylate/itaconic acid copolymer | (84:13:3) |
| I-48 | Vinyl chloride/acrylonitrile/itaconic acid copolymer | (82:14:4) |
| I-49 | Methylmethacrylate/butylacrylate/acrylic acid/glycidyl-methacrylate copolymer | (45:40:3:12) |
| I-50 | Styrene/butylacrylate/acrylic acid/glycidylacrylate copolymer | (48:38:2:12) |
| I-51 | Styrene/butylacrylate/acrylic acid/glycidylacrylate copolymer | (49:38.5:0.5:12) |
| I-52 | Styrene/butylacrylate/acrylic acid/glycidylmethacrylate copolymer | (46:40:3:11) |
| I-53 | Styrene/butylacrylate/itaconic acid/N-methylolacrylamide copolymer | (45:45:5:5) |
| I-54 | Ethylene/vinylacetate/itaconic acid copolymer | (70:27:3) |
| I-55 | Methylacrylate/acrylic acid copolymer | (96:4) |
| I-56 | Methacrylate/acrylic acid copolymer | (94:6) |
| I-57 | Ethylacrylate/acrylic acid copolymer | (96:4) |
| I-58 | Ethylacrylate/acrylic acid copolymer | (94:6) |
| I-59 | sec-Butylacrylate/acrylic acid copolymer | (96:4) |
| I-60 | sec-Butylacrylate/acrylic acid copolymer | (94:6) |
| I-61 | Styrene/methylacrylate/acrylic acid copolymer | (48:48:4) |
| I-62 | Styrene/ethylacrylate/acrylic acid copolymer | (48:48:4) |
| I-63 | Styrene/ethoxyethylacrylate/acrylic acid copolymer | (48:48:4) |
| I-64 | Styrene/methoxyethylacrylate/acrylic acid copolymer | (48:48:4) |
| Polymer Latexes of Group (II) | | |
| II-1 | Methylmethacrylate/itaconic acid copolymer | (98:2) |
| II-2 | Methylmethacrylate/acrylic acid copolymer | (98:2) |
| II-3 | Methylmethacrylate/methacrylic acid copolymer | (96:4) |
| II-4 | Methylmethacrylate/methacryloyloxyethylphosphate copolymer | (95:5) |
| II-5 | Methylmethacrylate/acrylic acid copolymer | (96:4) |
| II-6 | Ethylmethacrylate/acrylic acid copolymer | (97:3) |
| II-7 | Chloroethylmethacrylate/acrylic acid copolymer | (96:4) |
| II-8 | Trifluoroisopropylmethacrylate/itaconic acid copolymer | (99:1) |
| II-9 | Phenylmethacrylate/maleic acid copolymer | (98:2) |
| II-10 | Benzylmethacrylate/methacrylic acid copolymer | (96:4) |

-continued

| | | |
|---|---|---|
| II-11 | Vinylidene chloride/acrylonitrile/acrylic acid copolymer | (94:3:3) |
| II-12 | Methylmethacrylate/glycidylacrylate/acrylic acid copolymer | (90:8:2) |
| II-13 | Cyclohexylmethacrylate/divinylbenzene/itaconic acid copolymer | (85:10:5) |
| II-14 | tert-Butylmethacrylate/glycidylmethacrylate/acrylic acid copolymer | (87:10:3) |
| II-15 | Styrene/acrylic acid copolymer | (98:2) |
| II-16 | Styrene/itaconic acid copolymer | (98.5:1.5) |
| II-17 | Styrene/butylacrylate/acrylic acid/glycidylacrylate copolymer | (69:23:4:4) |
| II-18 | Styrene/butylacrylate/acrylic acid/glycidylacrylate copolymer | (67:23:4:6) |
| II-19 | Styrene/butylacrylate/acrylic acid/glycidylmethacrylate copolymer | (69:23:4:4) |
| II-20 | Styrene/butylacrylate/acrylic acid/glycidylmethacrylate copolymer | (67:23:4:6) |
| II-21 | Tetrahydrofurfurylmethacrylate/acrylic acid copolymer | (96:4) |
| II-22 | Vinyltoluene/maleic acid copolymer | (95:5) |
| II-23 | Methylmethacrylate/N-tert-butylacrylamide/acrylic acid copolymer | (92:5:3) |
| II-24 | Methylmethacrylate/1,1-dimethyl-3-oxobutylacrylamide/2-acrylamido-2-methylpropanesulfonic acid copolymer | (90:6:4) |
| II-25 | Methylmethacrylate/fumaric acid copolymer | (97.5:2.5) |
| II-26 | Vinylidene chloride/acrylonitrile/acrylic acid copolymer | (81:16:3) |
| II-27 | Vinylidene chloride/acrylonitrile/acrylic acid copolymer | (79:15:6) |
| II-28 | Vinylidene chloride/acrylonitrile/acrylic acid copolymer | (84:13:3) |
| II-29 | Vinylidene chloride/acrylonitrile/itaconic acid copolymer | (84:14:2) |
| II-30 | Vinylidene chloride/acrylonitrile/methylmethacrylate/acrylic acid copolymer | (84:10:3:3) |
| II-31 | Acrylonitrile/acrylic acid copolymer | (94:6) |
| II-32 | Vinylidene chloride/methylacrylate/acrylic acid copolymer | (95:2:3) |

The polymer latex used in the present invention can be synthesized using processes well known to those skilled in the art of synthesizing polymers. The polymer latex can be easily synthesized with reference to the descriptions appearing in the present specification and in, for example, U.S. Pat. Nos. 2,914,499, 3,033,833 and 3,547,899, Canadian Patent No. 704,778, etc.

The average particle size of latexes for the timing layer of the present invention is preferably about 0.05 to about 0.4 micron and particularly 0.05 to 0.2 micron. However, the average particle size can be suitably adjusted according to the purpose of the timing layer. (The average particle size is the number mean of the diameter of the particles measured microscopically in the conventional manner.)

The minimum film forming temperature of polymer latex can be determined by the method of measurement described in Example 1 hereinafter.

The polymer latex of Group (II) hardly provides a transparent smooth layer when it is dried using air of a low temperature, since it has a high minimum film forming temperature. However, by mixing it with the polymer latex of Group (I), the minimum film forming temperature can be decreased and thus the object of the present invention is achieved.

The ratio of mixing the polymer latex of Group (I) with the polymer latex of Group (II) is preferably (Group II):Group (I)) about 20:80 to 80:20, particularly about 30:70 to 70:30 in solid content ratio by weight, although a proper ratio varies depending on a combination of latex polymers to be mixed, in order to decrease the minimum film forming temperature and to prevent blocking. When the ratio of the polymer latex of Group (II) is less than about 50%, the minimum film forming temperature of the mixture system indicates almost same value as where the polymer latex of Group (I) is coated and dried individually.

In a neutralizing layer which is used together with the timing layer according to the present invention, the acid polymers as described in U.S. Pat. No. 3,362,819 and French Patent No. 2,290,699 and inorganic acids as described in U.S. Pat. No. 2,584,030 can be employed. Of these compounds, acid polymers, in particular polymers having a carboxy group or a precursor thereof (a functional group which is capable of releasing a carboxy group upon a reaction such as hydrolysis when it is reacted with a developing solution) in a side chain thereof are preferably used. Examples of polymers having a carboxy group in a side chain thereof include, for example, monobutyl ester of maleic anhydride-ethylene (1:1) copolymer, monobutyl ester of maleic anhydride-methyl vinyl ether (1:1) copolymer as described in U.S. Pat. No. 3,362,819; monoethyl ester, monopropyl ester, monopentyl ester or monohexyl ester of maleic anhydride-ethylene (1:1) copolymer; monoethyl ester, monopropyl ester, monopentyl ester or monohexyl ester of maleic anhydride-methyl vinyl ether (1:1) copolymer; polyacrylic acid; polymethacrylic acid; a copolymer of acrylic acid or methacrylic acid and other copolymerizable vinyl monomer (for example, an acrylic acid ester, a methacrylic acid ester, etc.); etc.

The polymers are generally dissolved in, for example, an alcohol such as methanol, ethanol, propanol, butanol, etc.; a ketone such as acetone, methyl ethyl ketone, cyclohexanone, etc.; an ester such as ethyl acetate, butyl acetate; or a mixture thereof, and coated on a support. A thickness of the acid polymer layer can be varied depending on a composition and an amount of processing agent used and thus it cannot be restricted in general. However, a range of 5 to 30 microns is preferred in a conventional use.

The timing layer used in the present invention can be produced by mixing at least one polymer latex of Group (I) and at least one polymer latex of Group (II) each produced by the above-described process and applying just as it is or after appropriate dilution with water to the neutralizing layer directly or indirectly. As used herein, the term "indirectly" means that the timing layer of the present invention is applied to the neutralizing layer through another timing layer (for example, a cellulose acetate layer) or an adhesion improving layer, etc.

Preferred examples of the other timing layers described above includes a timing layer produced by coating a mixture of cellulose acetate and a maleic anhydride copolymer such as a styrene-maleic anhydride copolymer, a vinyl acetate-maleic anhydride copolymer as described in U.S. Pat. Nos. 4,029,849 and 4,056,394, a timing layer composed of a homopolymer of hydroxyethyl acrylate or hydroxyethyl methacrylate or a copolymer of such a monomer and other copolymerizable vinyl monomer as described in Japanese Patent Publication No. 46496/77, etc.

Examples of adhesion improving layers include layers containing a hydrophilic colloid such as gelatin or polyvinyl alcohol, etc. These layers may function as the timing layer.

The photographic element of the present invention may be a cover sheet for covering the "photosensitive element" (but the neutralizing system is incorporated) or may be a so-called laminated film unit which comprises a support, a photosensitive member comprising an "image-receiving element" and a "photosensitive element", a "cover sheet" having the neutralizing system which are applied to the support in turn to form the film unit (but these elements may be strippable, if desired) and a "processing element" which is provided so that it can be spread between the photosensitive element and the cover sheet. Such a laminated film unit is preferred.

Further, the photographic element of the present invention may be a so-called strippable film unit which can be utilized as a negative, wherein a developing solution is spread between an image-receiving element applied to a support and an element comprising a neutralizing layer, a timing layer and a photosensitive element applied to a support in this order.

Further, the neutralizing system of the present invention may be present in the image-receiving element (that is, an element comprising a neutralizing layer, a timing layer and a mordanting layer applied to a support in this order), although such an embodiment is less preferred than the other embodiments.

The latex for the timing layer of the present invention can be provided by mixing at least one polymer latex of Group (I) and at least one polymer latex of Group (II) and coating by known methods, for example, using a spiral rod coater, an extrusion coater, a dip coater or an air knife coater, etc.

Various kinds of additives may be added to this latex mixture according to the purpose thereof. However, when a latex is produced and a timing layer is formed from the latex, it is preferred that a water-soluble substance other than a surface active agent which is used as an emulsifying agent or a coating aid is not added.

As such additives, it is preferred to use surface active agents for improving wetting at coating, solvents facilitating film formation (for example, methyl Cellosolve, ethyl Cellosolve, cyclohexanone, toluene, etc.), matting agents which are used for preventing adhesion at preparation or at use, such as silica powder or polymer beads, etc., bulking agents for improving the strength of the film (for example, colloidal silica, titanium dioxide, carbon black or diatomaceous earth, etc.) and plasticizers for improving the flexibility of the film (for example, phthalic acid esters such as dibutyl phthalate or dihexyl phthalate, etc., and phosphoric acid esters such as trialkyl phosphates or tricresyl phosphate, etc.), etc., according to the purpose. A preferred amount of the above-described surface active agents for improving wetting ranges from about 0.05 to about 0.5% (by weight). Although the amounts of these other additives can be suitably decided according to the purpose, a preferred amount of each of the additives ranges from about 0.1 to about 20% (by weight) and particularly 1 to 10% (by weight) based on the solid content of the latex polymer.

In the timing layer of the present invention, the polymer latex (of Group (I) polymer and Group (II) polymer) of the present invention can be used together with one or more other polymer latexes which are compatible with the polymer latex according to the present invention, if desired. For example, polymer latex which has characteristic such as improving the flexibility of the layer or improving the slippability of the surface of the layer, etc., can be used. In such a case, the other polymer latex can preferably be used in an amount from about 0.1 to about 200% (by weight) and particularly 1 to 100% (by weight) based on the amount of the polymer latex for forming the timing layer according to the present invention, although the amount of the other polymer latex can vary outside of the above range.

Although the thickness of the timing layer of the present invention advantageously ranges from about 0.5 to about 20μ and particularly 2 to 8μ, there is no limitation on the thickness. It can be suitably decided according to the purpose of using the timing layer.

In order to dry the timing layer of the present invention on coating, a method of using electromagnetic waves such as infrared rays or ultrasonic waves, etc., a contact heat-transmission method using a heating drum, or a method of using hot air can be suitably utilized.

The timing layer of the present invention not only can control the rate of alkali absorption by the neutralizing layer but also can control migration by diffusion of materials in the layers which are positioned on the opposite side of silver halide emulsion layers on the basis of the timing layer. Examples of layers which are positioned on the opposite side are the neutralizing layer described hereinbefore, a timing layer other than the present invention, an adhesion improving layer, etc.

It is preferred to previously add to the above described timing layer development inhibiting agents or precursors thereof (development inhibitor releasing type couplers and hydroquinones, and compounds which release a development inhibitor by hydrolysis as described in French Patent No. 2,282,124) or reducing agents for preventing fading by light, which cause disadvantageous chemical reactions if they move into the silver halide layers in the initial stage of the development. However, by application of the timing layer of the present invention, it becomes possible to block the migration of these materials so that they do not reach the silver halide emulsion layers in the initial stage of the development and they function after sufficient development has progressed. Of course, it is possible to control the effect of these additives by temperature. For example, when a development inhibiting agent or a precursor thereof for inhibiting excessive development is added to the neutralizing layer, the development is not inhibited at the beginning of the development at any temperature but it is inhibited after sufficient development has progressed to finally stop the development. Accordingly, it becomes possible to prevent the occurrence of stains or prevent an increase of the image densities caused by excessive development. Particularly, when the development temperature is high, stains easily occur due to excessive development, since the development rate is high. In such a case, if the timing layer of the present invention which has the characteristic that the permeability markedly increases as the temperature increases is used, the above-described disadvantages are suitably prevented.

Development inhibitor releasing type couplers (DIR coupler), which can be used herein, include those described in, for example, U.S. Pat. Nos. 3,227,554, 3,617,291, 3,701,783, 3,790,384 and 3,632,345, German Patent Application (OLS) Nos. 2,414,006, 2,454,301 and 2,454,329, British Patent No. 953,454 and Japanese Patent Application (OPI) No. 69624/77. Other compounds which release a development inhibitor during development which can be used are those described in, for example, U.S. Pat. Nos. 3,297,445 and 3,379,529 and German Patent Application (OLS) No. 2,417,914.

When the timing layer of the present invention is used, the effect of maintaining a high pH for a long period at a lower temperature is particularly excellent. Further, since a reduction in the transfer image densities is nearly completely corrected for by adjusting suitably the time for maintaining such a high pH, it is possible to obtain fixed transfer image densities in spite of a variation in the processing temperature.

Further, when the timing layer of the present invention is used, since the water permeability is markedly increased as the temperature increases, it is possible to obtain an effect where the permeation rate of water increases 2.5 times or more with every 10° C. increase in the temperature when the temperature is in the range of about 0° C. to about 40° C. By this effect, since the processing solution easily reaches the neutralizing layer by passing through the timing layer of the present invention at high temperature, there is the advantage that the pH of the processing solution is rapidly decreased to inhibit excessive development, namely, the formation of excess transfer images can be prevented.

Furthermore, there is the advantage that the cost of production is very low, because the latex used in the present invention can be produced from inexpensive starting materials using simple equipment. Further, if the latex of the present invention is used, drying after application is gradually carried out at a comparatively low temperature when water is present in the film in a large amount to form a film having less defects and the drying is then carried out at a high temperature by which latex particles sufficiently fuse to complete the film of the timing layer. Accordingly, there is the advantage that defects in the photographic images can be minimized.

The evaluation of the usefulness of the timing layer of the present invention in which water permeability markedly increases as the temperature increases can be carried out by the correspondence between the variation of photographic development by temperature and variation of water permeability by temperature.

The water permeability of the timing layer is preferably described as the time required for the pH of the alkaline processing solution to decrease on passing through the timing layer and being absorbed in the neutralizing layer.

In this case, when the time required for the pH to reach 10 (it is generally understood in the photographic art that photographic development substantially stops at this pH) is measured, it has been found that there is a very good correspondence between the change in temperature and the change in transfer image densities with temperature. It is preferred to measure the time required for a pH of 10 to be reached using a pH indicating dye which does not decompose under alkaline conditions. It is particularly preferred to measure using Thymolphthalein which is a dye whose color changes at a pH of 10 as the pH indicator as described in Example 3 hereinafter.

When the variation of the time which it takes the pH of the alkaline processing solution to decrease to a pH of 10 is measured for the timing layer of the present invention with the temperature and prior art timing layers using Thymolphthalein using the method shown in Example 3 hereinafter of the present invention, it has been found that the variation of time with temperature has a clear relationship to the variation of image transfer densities with temperature. It is preferred that the measurement temperature be 25° C. which is a normal temperature and 15° C. and a preferred embodiment of the timing layer of the present invention is prescribed on the basis of the ratio of the time required for reaching a pH of 10 at 15° C. to that at 25° C., namely, $T_{15}/T_{25}$ ($T_{15}$ and $T_{25}$ are each the time required for reaching a pH of 10 at 15° C. or at 25° C.).

It is preferred for the value of $T_{15}/T_{25}$ measured according to the method described in Example 3 given hereinafter to be in the range of about 2.5 to about 6.0 and, particularly, 3.0 to 5.0. In the timing layer described in U.S. Pat. No. 3,785,815 discussed above, this range cannot be obtained and, consequently, the temperature dependence of the transfer image densities is large when such a timing layer is used.

The silver halide emulsion which can be used in a photosensitive element of a diffusion transfer type photographic material incorporating the neutralizing system of the present invention are hydrophilic colloid dispersions of silver chloride, silver bromide, silver bromochloride, silver bromoiodide, silver iodobromochloride or a mixture thereof. Although the composition of halides is suitably selected according to the purpose or processing conditions of the light-sensitive materials, a silver iodobromide or silver iodobromochloride having an iodine content of about 1% by mol to about 10% by mol (a chloride content of about 30% by mol or less) and the balance of bromide is particularly preferred. In the present invention, although emulsions wherein grains easily form latent images on the surface thereof may be used, it is preferred to use internal latent image type direct reversal emulsions as described in U.S. Pat. Nos. 2,497,875, 2,588,982, 2,456,953, 3,761,276, 3,206,313, 3,317,332, 3,761,266, 3,850,637, 3,923,513, 3,736,140, 3,761,267 and 3,854,949.

Suitable color image forming materials for the diffusion transfer process used in combination with the above photographic emulsions are the compounds described in, for example, U.S. Pat. Nos. 3,227,551, 3,227,554, 3,443,939, 3,443,940, 3,658,524, 3,698,897, 3,725,062, 3,728,113, 3,751,406, 3,929,760, 3,931,144 and 3,932,381, British Patents 840,731, 904,364 and 1,038,331, German Patent Applications (OLS) 1,930,215, 2,214,381, 2,228,361, 2,242,762, 2,317,134, 2,402,900, 2,406,626 and 2,406,653 and Japanese Patent Applications (OPI) Nos. 114424/74, 126332/74, 33826/73, 126331/74, 115528/75, 113624/76, 104343/76, 8827/77, 106727/77, 23628/78, 143323/78 and 149328/78, U.S. Patent Application Ser. Nos. 917,759 and 956,698, etc. Particularly, diffusible dye releasing type redoc compounds (DRR compounds) are preferred for use.

Examples of DRR compounds include 1-hydroxy-2-tetramethylenesulfamoyl-4-[3'-methyl-4'-(2"-hydroxy-4"-methyl-5"-hexadecyloxyphenylsulfamoyl)-phenylazo]naphthalene as a magenta image forming material, and 1-phenyl-3-cyano-4-{3'-[2"-hydroxy-4"-methyl-5"-(2''',4'''-di-t-pentylphenoxyacetamido)-phenylsulfamoyl]phenylazo}-5-pyrazolone as a yellow image forming material in addition to the compounds described in the above-mentioned patents. The above-described DRR compounds may be contained in the emulsion layer or a layer adjacent thereto.

Various types of silver halide emulsions can be used in the present invention. It is preferred that the direct reversal emulsions in which no development occurs in the exposed areas and development occurs in the unexposed areas be used in combination with compounds which release a diffusible dye by oxidation-reduction reaction upon development. As the direct reversal emulsion, internal latent image type emulsions which contain grains consisting of a core and a shell and having light-sensitive specs internal thereto are particularly preferred.

The use of such direct reversal emulsions in combination with the DRR compounds, for example, those described hereinafter will provide good color images. In this occasion, the silver halide (fogged by fogging treatment) in the unexposed areas of the direct reversal emulsion oxidizes the developing agent and the resulting oxidation product thereof, in turn, oxidizes the DRR compound contained in the silver halide emulsion layer or a layer adjacent thereto to release the diffusible dye (i.e., form color transfer images).

In the present invention, in using DRR compounds, any silver halide developing agent can be used if such is capable of oxidizing DRR compounds. Such a developing agent may be incorporated in the alkaline processing compositions (processing element) or may be incorporated in a suitable layer in the photosensitive element. Examples of developing agents which can be used in the present invention include the following compounds: hydroquinone, aminophenols such as N-methylaminophenol, 1-phenyl-3-pyrazolidone, 1-phenyl-4,4-dimethyl-3-pyrazolidone, 1-phenyl-4-methyl-4-oxymethyl-3-pyrazolidone, N,N-diethyl-p-phenylenediamine, 3-methyl-N,N-diethyl-p-phenylenediamine and 3-methoxy-N-ethoxy-p-phenylenediamine, etc.

Of these compounds, black-and-white developing agents having the ability to reduce stain formation of the image-receiving layer (mordanting layer) are particularly preferred.

The direct reversal photographic emulsions used in the present invention can be used to form positive images directly by conducting the development in the presence of a fogging agent after imagewise exposing to light or by fogging by applying a uniform exposure (a high illuminance exposure for a short time, namely, exposure for $10^{-2}$ second or less, or a low illuminance exposure for a long time) in surface development processing after imagewise exposing to light, as described in U.S. Pat. No. 2,456,953 (Knott and Stevens). It is preferred to use a fogging agent because the degree of fogging can be easily controlled. Although the fogging agent may be added to the developing solution, it is more preferred to incorporate the fogging agent in the light-sensitive material. Suitable fogging agents which can be used in emulsions include hydrazines described in U.S. Pat. Nos. 2,588,982 and 2,568,785, hydrazides and hydrazones described in U.S. Pat. No. 3,227,552, and quaternary salt compounds described in British Patent No. 1,283,835, Japanese Patent Publication No. 38164/74 and U.S. Pat. Nos. 3,734,738, 3,719,494 and 3,615,615.

The amount of the fogging agent used here can be widely changed depending on the results required. Where the fogging agent is added to the light-sensitive materials, the fogging agent is generally used in a range of about 50 mg to about 10 g/mol of Ag and preferably 300 mg to 5 g/mol of Ag.

Where the fogging agent is added to the developing solution, the fogging agent is generally used in a range of about 0.05 to 5 g, preferably 0.1 to 1 g, per liter of the developing solution. Where the fogging agent is incorporated in a layer in the light-sensitive material, it is effective for the fogging agent to be rendered non-diffusible. A ballast group commonly used for couplers can be linked to the fogging agent to render it non-diffusible.

Further, diffusion transfer positive images can also be obtained using a DIR reversal emulsion process as described in U.S. Pat. Nos. 3,227,551, 3,227,554 and 3,364,022 or a reversal emulsion process by solution physical development as described in British Patent No. 904,364. Processes for forming color diffusion transfer images are described in U.S. Pat. Nos. 3,227,550 and 3,227,552 and British Patent No. 1,330,524, etc.

Suitable and typical color developing agents which can be used with diffusible dye releasing type couplers (DDR couplers) in the present invention are p-phenylenediamine derivatives described in U.S. Pat. Nos. 3,227,552, 2,559,643 and 3,813,244. Further, p-aminophenol derivatives as described in Japanese Patent Application (OPI) No. 26134/73 can be advantageously used. Such color developing agents are preferably added to an alkaline processing composition for development retained in a rupturable container. The color developing agent may be added to a layer provided on a photosensitive element of the film unit or may be added to the same silver halide emulsion layer.

The image-receiving element should have a mordanting layer composed of a mordanting agent such as poly-4-vinylpyridine-latex (particularly, in polyvinyl alcohol) as described in U.S. Pat. No. 3,148,061, polyvinylpyrrolidone as described in U.S. Pat. No. 3,003,872 and polymers containing quaternary ammonium salt groups or phosphonium salt groups as described in U.S. Pat. Nos. 3,239,337, 3,958,995, 3,770,439 and 3,898,088 and German Patent Application (OLS) No. 2,264,073, etc. The basic polymers described in U.S. Pat. Nos.

2,882,156, 3,625,694 and 3,709,690 are also effective as mordanting agents. In addition, mordanting agents described in U.S. Pat. Nos. 2,484,430, 3,271,147, 3,184,309 and 3,271,147, etc., are also effective.

The photographic element for DTR color used in the present invention has a support which does not undergo any marked dimensional change during processing. Examples of such supports include those used in conventional photographic light-sensitive materials such as cellulose acetate films, polystyrene films, polyethylene terephthalate films and polycarbonate films, etc. In addition, examples of effective supports include paper and laminated paper, whose surface is covered with a water-impermeable polymer such as polyethylene.

The processing composition used in the present invention is a liquid composition containing processing components necessary for the development of the silver halide emulsions and for formation of the diffusion transfer dye images, wherein the solvent is mainly water and may contain hydrophilic solvents such as methanol or methyl Cellosolve. The processing composition contains an alkali in an amount sufficient to maintain the pH required for the development of the emulsion layers and to neutralize acids (for example, hydrohalic acids such as hydrobromic acid or carboxylic acids such as acetic acid, etc.) formed during the steps of development and dye image formation. Examples of alkalis which can be used include alkali metal salts, alkaline earth metal salts and amines such as lithium hydroxide, sodium hydroxide, potassium hydroxide, a dispersion of calcium hydroxide, tetramethylammonium hydroxide, sodium carbonate, trisodium phosphate or diethylamine, etc. It is preferred to add an alkali in such a concentration that the pH becomes about 10 or more and preferably 12 or more at room temperature. A further preferred processing composition contains hydrophilic polymers having a high molecular weight such as polyvinyl alcohol, hydroxyethyl cellulose or sodium carboxymethyl cellulose. These polymers not only provide the processing composition with a viscosity of more than about 1 poise and preferably a viscosity in the range of several hundred (500–600) to 1,000 poises at room temperature which facilitates a uniform spreading of the composition at processing but also form a nonfluid film to help unify the film unit after processing when the composition was concentrated by diffusion of the aqueous solvent into the photosensitive element and the image-receiving element during processing. After the formation of the diffusion transfer dye images is substantially completed, this polymer film inhibits movement of coloring components into the image-receiving layer to prevent a deterioration of the images.

It is sometimes advantageous for the processing composition to contain light absorbing materials such as $TiO_2$, carbon black or a pH indicator or desensitizing agents described in U.S. Pat. No. 3,579,333 in order to prevent fogging of the silver halide emulsion by ambient light during processing. Further, development inhibiting agents such as benzotriazole may be added to the processing composition, if desired.

It is preferred for the above-described processing composition to be used in a rupturable container, e.g., as described in U.S. Pat. Nos. 2,543,181, 2,643,886, 2,653,732, 2,723,051, 3,056,491, 3,056,492 and 3,152,515, etc.

The photographic film unit of the present invention, namely, a film unit capable of being processed by passage through a pair of opposing pressure applying members, comprises the following elements:

(1) a photosensitive element as described above,
(2) an image-receiving element as described above, and
(3) means for releasing the alkaline processing composition in the interior of the film unit, such as a rupturable container, and containing a silver halide developing agent.

The photosensitive element in the above-described film unit is superposed on the image-receiving element (which includes the neutralizing system of the present invention) in a face-to-face relationship after exposure to light, and is processed by spreading the alkaline processing composition between these two elements. In this case, the image-receiving element may be stripped off (delaminated) after completion of the diffusion transfer process. Further, the film unit may be of the type where the image can be observed without stripping off the image-receiving element, e.g., as described in U.S. Pat. No. 3,415,645.

In another embodiment, the image-receiving layer in the above-described film unit may be arranged in a photosensitive element comprising a support. For example, as described in Belgian Patent No. 757,960, an image-receiving layer, a substantially opaque light-reflection layer (for example, a $TiO_2$ layer and a carbon black layer) and a photosensitive element composed of one or more light-sensitive silver halide emulsion layer are applied to a transparent support, can be effectively used. After the light-sensitive element is exposed to light, the light-sensitive element is superposed on an opaque cover sheet (which includes the neutralizing system of the present invention) in a face-to-face relationship and the processing composition is spread therebetween.

Another embodiment which is an integral type embodiment capable of being utilizing in the present invention is described in Belgian Patent No. 757,959. According to this embodiment, an image-receiving layer, a substantially opaque light-reflection layer (for example, as described above) and a photosensitive element composed of one or more photosensitive layers are applied to a transparent support and a transparent cover sheet (which includes the neutralizing system of the present invention) is superposed thereon in a face-to-face relation. A rupturable container retaining an alkaline processing composition containing a light-shielding agent (for example, carbon black) is positioned so that it is adjacent the top layer (protective layer) of the above-described light-sensitive element and the transparent cover sheet. This film unit is exposed to light through the transparent cover sheet and taken out of the camera, by which the container is ruptured by the pressing members, the processing composition (containing the light-shielding agent) is spread uniformly between the light-sensitive element and the cover sheet. Thus, film unit is shielded from light and the development proceeds.

Of the above embodiments, the embodiments wherein the neutralizing system of the present invention is contained in a cover sheet are preferred to the embodiment where the neutralizing system of the present invention is located with the image-receiving unit.

Other useful film units of integral type embodiments capable of using DRR compounds or DDR couplers in the present invention are described in U.S. Pat. Nos.

3,415,644, 3,415,645, 3,415,646, 3,647,487 and 3,635,707 and German Patent Application (OLS) No. 2,426,980.

The following examples are given to illustrate the present invention in greater detail.

EXAMPLE 1

I-3, I-4, I-17, I-18, I-42, I-45, I-50 and I-51 of the polymer latex of Group (I) and II-2, II-5, II-17, II-18, II-19, II-20, II-27, II-28, II-30 and II-32 of the polymer latex of Group (II) were coated individually or in admixture and dried, and the minimum film forming temperature was measured. The results obtained are shown in Table A below. The measurement of the minimum film forming temperature was carried out as follows:

(I) The method described in ASTM D-2354-68 was used when the minimum film forming temperature was 25° C. or less. The latex was coated in a predetermined thickness (e.g., 150 μm) on a metal plate, one end of which was immersed in a tank containing dry ice/isopropanol and the other end of which was immersed in a tank of water at 25° C. to thereby produce a linear temperature gradient in the metal plate. After drying for a sufficient period of time, the dry film thus-formed on the metal plate was observed for turbid areas and transparent areas, and the temperature at the portion of the film where the turbid area and the transparent area are contiguous is defined as the film forming temperature.

(II) The method described in *Journal of Applied Polymer Science*, Vol. IV, No. 10, pp. 81-85 (1960) was used when the minimum film forming temperature was more than 25° C. Substantially the same procedure as that described in (I) above was repeated except that the tank of dry ice/isopropanol was replaced by a dry ice tank and the water tank was replaced by a metal block.

TABLE A

Minimum Film Forming Temperature of Polymer Latex

| Test No. | Group (I) Latex | Group (II) Latex | Group (I)/Group (II) (solid concentration) | Minimum Film Forming Temperature (°C.) |
|---|---|---|---|---|
| 1 | I-3 | — | 10/0 | 31.6 |
| 2 | I-4 | — | " | 31.0 |
| 3 | I-17 | — | " | 14.5 |
| 4 | I-18 | — | " | 15.5 |
| 5 | I-42 | — | " | 5.6 |
| 6 | I-45 | — | " | 30.1 |
| 7 | I-50 | — | " | 8.5 |
| 8 | I-51 | — | " | 7.8 |
| 9 | — | II-2 | 0/10 | 106.5 |
| 10 | — | II-5 | " | 107.6 |
| 11 | — | II-17 | " | 40.9 |
| 12 | — | II-18 | " | 39.9 |
| 13 | — | II-19 | " | 42.6 |
| 14 | — | II-20 | " | 41.6 |
| 15 | — | II-27 | " | 38.9 |
| 16 | — | II-28 | " | 39.6 |
| 17 | — | II-30 | " | 38.9 |
| 18 | — | II-32 | " | 43.9 |
| 19 | I-3 | II-5 | 5/5 | 36.5 |
| 20 | I-4 | " | " | 35.2 |
| 21 | I-17 | II-5 | 5/5 | 19.8 |
| 22 | I-18 | " | " | 21.6 |
| 23 | I-42 | " | " | 13.2 |
| 24 | I-45 | " | " | 36.2 |
| 25 | I-50 | " | " | 16.6 |
| 26 | I-51 | " | " | 19.7 |
| 27 | I-50 | II-2 | " | 17.9 |
| 28 | " | II-17 | " | 16.7 |
| 29 | " | II-18 | " | 18.9 |
| 30 | " | II-19 | " | 17.1 |
| 31 | " | II-20 | " | 18.8 |
| 32 | " | II-27 | " | 16.5 |
| 33 | " | II-28 | " | 17.8 |

TABLE A-continued

Minimum Film Forming Temperature of Polymer Latex

| Test No. | Group (I) Latex | Group (II) Latex | Group (I)/Group (II) (solid concentration) | Minimum Film Forming Temperature (°C.) |
|---|---|---|---|---|
| 34 | " | II-30 | " | 15.6 |
| 35 | " | II-32 | " | 16.1 |
| 36 | I-42/I-51 | II-30 | 2/2/10 | 23.6 |
| 37 | I-45 | II-17 | 5/5 | 32.6 |
| 38 | " | II-18 | " | 33.5 |
| 39 | " | II-19 | " | 33.1 |
| 40 | " | II-20 | " | 34.1 |
| 41 | I-42 | II-30 | 4/6 | 11.6 |

It is apparent from the results shown in Table A that when the polymer latex of Group (I) was mixed with the polymer latex of Group (II), the minimum film forming temperature could be markedly decreased in comparison with when the polymer latex of Group (II) was used alone.

Further, in both cases wherein a polymer containing itaconic acid as a monomer component such as I-20 as a polymer of Group (I) is used in combination with a polymer of Group (II), for example, II-5, and wherein a polymer of Group (I), for example, I-50, is used in combination with a polymer containing itaconic acid as a monomer component such as II-1 as a polymer of Group (II), the minimum film forming temperature can be remarkably decreased in comparison with cases wherein the polymer of Group (II) is individually used.

EXAMPLE 2

To a polyethylene terephthalate film having a thickness of 100μ, a neutralizing layer prepared in the following manner (I) below and a cellulose acetate timing layer prepared in the following manner (II) below were applied in turn. Further, on the timing layer, the polymer latexes shown in Table B were coated to prepare the timing layer according to the present invention. The coatings thus-prepared are designated cover sheet Nos. 1 to 8.

(I) Application of Neutralizing Layer 3.8 g of 5-(2-cyanoethylthio)-1-phenyltetrazole was dissolved in 1 kg of a 20% solution of acrylic acid-butyl acrylate copolymer (molar ratio 8:2) having an average molecular weight of 50,000 (solvent: acetone-water 3:1 (by volume)). This solution was applied in an amount of 110 g per square meter using an extrusion coater and dried with dry air having a velocity of 5 m per second, a temperature of 120° C. and a dew point of 5° C. for 5 minutes to obtain a film having a thickness of about 20μ.

(II) Application of Cellulose Acetate Timing Layer 55 g of cellulose acetate having an acetylation degree of 52.1% (weight of acetic acid released by hydrolysis: 0.521 g per g of sample) (LM-70 produced by Daisel Ltd.) and 5 g of a styrene-maleic acid anhydride copolymer (molar ratio: 1:1) having an average molecular weight of 10,000 were dissolved in a solvent mixture of acetone and cyclohexanone (vol ratio of 3:1). This solution was applied to the neutralizing layer produced by the method shown in (I) above in an amount of 50 g per square meter using an extrusion coater and dried with dry air having a velocity of 4 m per second, a temperature of 80° C. and a dew point of 5° C. to obtain a film having a thickness of about 2.6μ.

TABLE B

List of Cover Sheets for Testing

| Cover Sheet No. | Polymer Latex Composition (solid content ratio) | Dry Thickness of Latex Timing Layer (μ) | Dry condition of Latex Timing Layer | Remarks |
|---|---|---|---|---|
| 1 | I-17 (alone) | 2.1 | 100° C., 5 minutes | Comparison (using Group (I) only) |
| 2 | I-17/II-5 (5/5) | 2.0 | 100° C., 5 minutes | Present Invention |
| 3 | I-42 (alone) | 2.2 | 100° C., 5 minutes | Comparison (using Group (I) only) |
| 4 | I-42/II-30 (4/6) | 2.4 | 100° C., 5 minutes | Present Invention |
| 5 | I-42/I-51/II-30 (2/2/10) | 2.6 | 100° C., 5 minutes | Present Invention |
| 6 | I-45 (alone) | 2.0 | 105° C., 5 minutes | Comparison (using Group (I) only |
| 7 | I-45/II-18 (5/5) | 1.5 | 105° C., 5 minutes | Present Invention |
| 8 | I-45/II-19 (5/5) | 1.5 | 105° C., 5 minutes | Present Invention |

These Cover Sheet Nos. 1 to 8 and a photosensitive sheet prepared by the method described hereinafter were placed in a room maintaining a temperature of 40° C. and a relative humidity at 70% for a sufficient time for these sheets to absorb moisture in the air to reach the equilibrium. Then, a coated surface of each of the cover sheets and a coated surface of the photosensitive sheet were placed face to face and a load of 50 g per 1 square centimeter was applied to each of these sets. After standing for 1 day, the degree of a blocking defects was measured using a ratio of areas where the blocking occurred. The results obtained are shown in Table C.

TABLE C

Results of Blocking Test

| Cover Sheet No. | Blocking Area Ratio (ratio of areas blocking occurred) (%) | Remarks |
|---|---|---|
| 1 | 85 | Comparison |
| 2 | 3 | Present Invention |
| 3 | 81 | Comparison |
| 4 | 6 | Present Invention |
| 5 | 8 | Present Invention |
| 6 | 36 | Comparison |
| 7 | 5 | Present Invention |
| 8 | 3 | Present Invention |

It is apparent from the results shown in Table C that in the timing layers which were prepared by using a mixture of a polymer latex of Group (II) and a polymer latex of Group (I), the occurrence of blocking extremely decreases, although the blocking considerably occurs in the timing layers formed from a polymer latex of Group (I) alone.

(III) Production of Photosensitive Sheet

To a transparent polyethylene terephthalate support having a thickness of 180μ, the following layers were provided in order:

(1) a layer comprising a mordanting agent (3.0 g/m²) of the following formula:

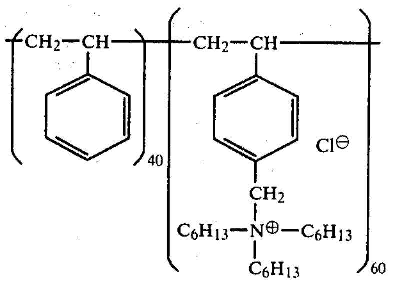

and gelatin (3.0 g/m²)

(2) a layer comprising titanium dioxide (20 g/m²) and gelatin (2.0 g/m²)

(3) a layer comprising carbon black (2.5 g/m²) and gelatin (2.5 g/m²)

(4) a layer comprising cyan image-forming material (0.50 g/m²) of the following formula:

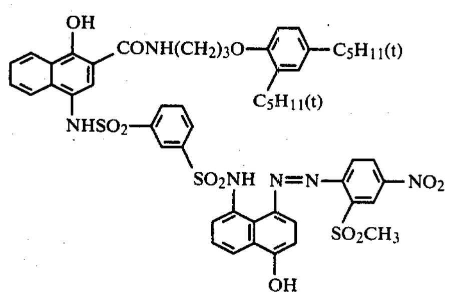

diethyl laurylamide (0.25 g/m²) and gelatin (1.14 g/m²)

(5) a layer comprising a red-sensitive internal latent imagetype direct reversal silver iodobromide emulsion (composition of halogen in silver halide: 2% by mol iodide; amount of silver: 1.9 g/m²; gelatin: 1.4 g/m²), a fogging agent (0.028 g/m²) of the following formula:

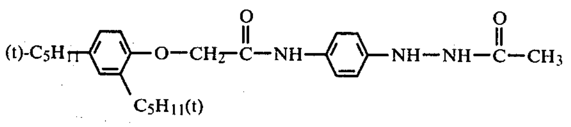

and sodium pentadecylhydroquinone sulfonate (0.13 g/m²)

(6) a layer comprising gelatin (2.6 g/m²) and 2,5-di-octylhydroquinone (1.0 g/m²)

(7) a layer comprising a magenta image-forming material (0.45 g/m²) of the following formula:

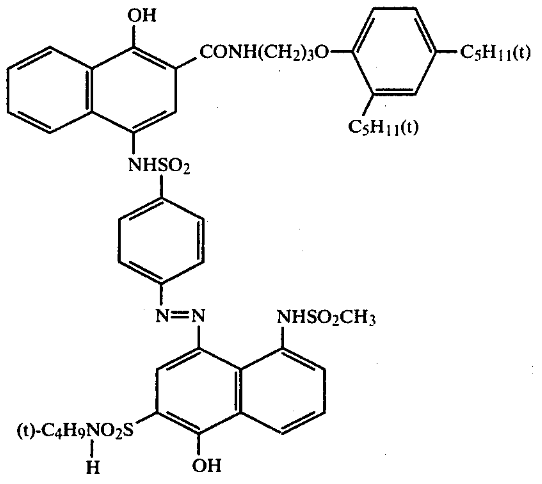

diethyllaurylamide (0.10 g/m$^2$), 2,5-di-t-butylhydroquinone (0.0074 g/m$^2$) and gelatin (0.76 g/m$^2$)

(8) a layer comprising a green-sensitive internal latent image type direct reversal silver iodobromide emulsion (composition of halogen in silver iodobromide: 2% by mol iodide; amount of silver: 1.4 g/m$^2$; gelatin: 1.0 g/m$^2$), the same fogging agent as described for layer (5) (0.024 g/m$^2$) and sodium pentadecylhydroquinone sulfonate (0.11 g/m$^2$)

(9) a layer comprising gelatin (2.6 g/m$^2$) and 2,5-dioctylhydroquinone (1.0 g/m$^2$)

(10) a layer comprising a yellow image-forming material (0.78 g/m$^2$) of the following formula:

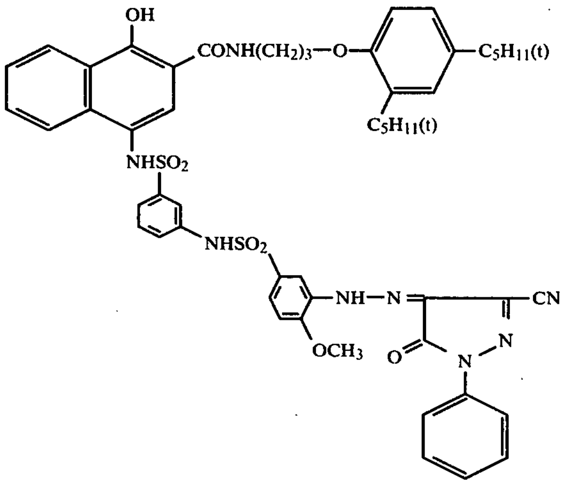

diethyl laurylamide (0.16 g/m$^2$), 2,5-di-t-butylhydroquinone (0.012 g/m$^2$) and gelatin (0.78 g/m$^2$)

(11) a layer comprising a blue-sensitive internal latent image type direct reversal silver iodobromide emulsion (composition of halogen in silver iodobromide: 2% by mol iodide; amount of silver: 2.2 g/m$^2$; gelatin: 1.7 g/m$^2$), the same fogging agent as described for layer (5) (0.020 g/m$^2$) and sodium pentadecylhydroquinone sulfonate (0.094 g/m$^2$), and

(12) a layer comprising gelatin (0.94 g/m$^2$)

EXAMPLE 3

Each of Cover Sheet Nos. 1 to 8 prepared in Example 2 was placed face-to-face with a pH indicator coating film prepared by the method described in (IV) below and an alkaline viscous solution prepared by the method shown in (V) below was spread between them in a liquid thickness amount of 120μ. Then, the optical density was measured on the pH indicator coating film. The period of time required for reducing by half the reflection density of the high pH color (blue) of Thymolphthalein by neutralization (this period of time is presumed to be the period of time for reaching a pH of 10) at 25° C. and that at 15° C. were measured. The results of the tests are shown in Table D below.

TABLE D

Temperature Dependency of Time Required for Decreasing pH

| Cover Sheet No. | Time (pH → 10) (minute) 25° C. ($T_{25}$) | 15° C. ($T_{15}$) | $T_{15}/T_{25}$ | Remarks |
|---|---|---|---|---|
| 1 | 9.5 | 41.3 | 4.34 | Comparison |
| 2 | 9.1 | 43.8 | 4.81 | Present Invention |
| 3 | 9.3 | 39.1 | 4.20 | Comparison |
| 4 | 9.9 | 45.8 | 4.63 | Present Invention |
| 5 | 8.9 | 46.1 | 5.18 | Present Invention |
| 6 | ∞ | ∞ | — | Comparison* |
| 7 | 9.7 | 40.0 | 4.12 | Present Invention |
| 8 | 10.1 | 39.7 | 3.93 | Present Invention |

*not water-permeable

It is apparent from the results shown in Table D that, when the timing layer of the present invention is used, the water permeability is markedly decreased at a low temperature and the period of time required for reducing pH at a low temperature is sufficiently low.

(IV) Production of pH Indicating Coating Film

To a polyethylene terephthalate film having a thickness of 180μ, a 7% solution of gelatin containing 28.5 mg of Thymolphthalein per g of gelatin (solvent: a mixture of water-methanol (4:1 by volume)) was applied in an amount of 100 g per square meter to form a film having a thickness of about 6.5μ. To the resulting film, a dispersion of titanium dioxide (solid content 10%) composed of 9 g of titanium dioxide per g of gelatin was applied in an amount of 300 g per square meter to form a white film having a dry thickness of about 9μ. Further, to the resulting film, the same solution of gelatin containing Thymolphthalein as described above was applied in the same manner and dried to complete the application.

(V) Preparation of Viscous Alkaline Processing Solution 30 g of hydroxyethyl cellulose (Natrosol 250-HR, produced by Hercules, Inc.) and 30 g of sodium hydroxide were dissolved in 940 g of water with stirring and the solution was used after defoaming.

EXAMPLE 4

The photographic sensitive sheet described in Example 2 was placed face to face with Cover Sheet No. 2 described in Example 2. After providing an imagewise exposure through the cover sheet, an alkaline processing solution shown in (VI) below was uniformly spread between these sheets in a liquid thickness amount of about 100μ. The dyes were adsorbed on a mordanting layer of the photosensitive sheet to form images. Although the processing was carried out at temperature of 15° C., 25° C. and 35° C., respectively, the processing temperature dependency of the image density obtained was small. Similar results were obtained when Cover Sheet Nos. 4, 5, 7 and 8 described in Example 2 were used.

| (VI) Composition of Alkaline Processing Solution | |
|---|---|
| 1-Phenyl-4-methyl-4-hydroxymethyl-pyrazolidinone | 10 g |
| Methylhydroquinone | 0.18 g |
| 5-Methylbenzotriazole | 4.0 g |
| Sodium Sulfite (anhydrous) | 1.0 g |
| Na Carboxymethylcellulose | 40.0 g |
| Carbon Black | 150 g |
| Potassium Hydroxide (28% aq. soln.) | 200 cc |
| $H_2O$ | 550 cc |

0.8 g of the processing solution having the above-described composition was placed in a container which was rupturable on pressing.

While the invention has been described in detail and with reference to specific embodiments thereof, it will be apparent to one skilled in the art that various changes and modifications can be made therein without departing from the spirit and scope thereof.

What is claimed is:

1. In a photographic element for the color diffusion transfer process including a neutralizing system for reducing the pH of an aqueous alkaline developing solution which comprises a support having coated thereon a neutralizing layer and a timing layer wherein the timing layer is positioned on or under the neutralizing layer in direct or indirect contact therewith such that the aqueous alkaline developing solution reaches the neutralizing layer through the timing layer, the improvement which comprises said timing layer comprising a mixture of at least one polymer latex the minimum film forming temperature of which is 35° C. or less (Group I) and at least one polymer latex the minimum film forming temperature of which is greater than 35° C. (Group II) each polymer latex being produced by emulsion polymerization of (i) at least one monomer selected from the group consisting of monomers of Group (A) and at least one monomer selected from the group consisting of monomers of Group (B), or (ii) at least one monomer selected from the group consisting of monomers of Group (A), at least one monomer selected from the group consisting of monomers of Group (B) and at least one monomer selected from the Group (C), wherein said Group (A) monomers are ethylene type monomers having at least a free carboxylic acid group or a salt thereof; said Group (B) monomers are represented by the following general formula (M):

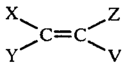

(M)

wherein X and Y, which may be the same or different, each represents a hydrogen atom, a methyl group, a halogen atom or a $—COOR^1$ group; Z represents a hydrogen atom, a methyl group, a halogen atom or a $—(CH_2)_nCOOR^2$ group; V represents an aryl group, a $—COOR^3$ group or an

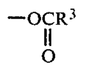

group; $R^1$, $R^2$ and $R^3$, which may be the same be the same or different, each represents an aliphatic group or an aryl group; and n represents an integer of 0 to 3;

said Group (C) monomers are monofunctional or polyfunctional unsaturated monomers other than the monomers of Group (A) and Group (B) which are copolymerizable with the monomers of Group (A) and Group (B), the monofunctional monomers being selected from the group consisting of acrylamides, methacrylamides, vinyl ethers, vinyl ketones, allyl compounds, vinyl heterocyclic compounds, and unsaturated nitriles, and the polymer latex layer is water permeable.

2. The photographic element of claim 1, wherein the mixing ratio for the polymer latex of Group (II) to the polymer latex of Group (I) is about 20:80 to 80:20.

3. The photographic element of claim 2, wherein said mixing ratio is about 30:70 to 70:30.

4. The photographic element of claim 1, wherein the amount of Group (A) monomer in said polymer latex having a minimum film forming temperature of 35° C. or less and said polymer latex having a minimum film forming temperature of greater than 35° C. is about $0.1\times10^{-3}$ to $2.2\times10^{-3}$ mol per g of solid content of the polymer latex.

5. The photographic element of claim 4, wherein the amount of Group (A) monomer is about $0.1\times10^{-3}$ to $1.0\times10^{-3}$ mol per g of latex polymer.

6. The photographic element of claim 1, wherein the amount of said Group (B) monomer in said polymer latexes is about 50 to 99% by weight.

7. The photographic element of claim 1, wherein the amount of Group (C) monomers in said polymer latexes is about 0 to 49% by weight.

8. The photographic element of claim 1, wherein said polymer latex of Group (I) is selected from polymer latexes prepared from monomer composition containing: 36% or more of n-butyl acrylate, 65% or more of methyl acrylate, 43% or more of ethyl acrylate, 37% or more of n-propyl acrylate, 45% or more of sec-butyl acrylate, 77% or more of n-butyl methacrylate, 38% or more of methoxyethyl acrylate, or 36% or more of ethoxyethyl acrylate.

9. The photographic element of claim 1, wherein said polymer latex of Group (II) is selected from polymer latexes prepared from a monomer composition containing: 65% or more of styrene, 69% or more of methyl methacrylate, 68% or more of t-butyl methacrylate, 80% or more of ethyl methacrylate, 68% or more of phenyl methacrylate, 93% or more of benzyl methacrylate, 72% or more of vinyl toluene, 92% or more of vinylidene chloride, or 85% or more of tetrahydrofurfuryl methacrylate.

10. The photographic element of claim 1, wherein said photographic element is a cover sheet.

11. The photographic element of claim 1, wherein said photographic element is a laminated integral type film unit which comprises: a photosensitive member comprising an image-receiving element and a photosensitive element comprising one or more silver halide emulsion layer(s) coated in turn on a support, a cover sheet including said neutralizing system, and a processing element capable of being spread between said photosensitive element and said cover sheet.

12. The photographic element of claim 11, wherein said element is a strippable element.

13. The photographic element of claim 11, wherein said photosensitive element contains at least one silver halide photographic emulsion layer and a dye image forming material associated therewith.

14. The photographic element of claim 13, wherein said dye image-forming material is present in a layer adjacent said photographic emulsion layer.

15. The photographic element of claim 13, wherein said dye image-forming material is a compound capable of being oxidized by an oxidation product of a developing agent and releasing a diffusible dye.

16. The photographic element of claim 15, wherein said photographic material includes a direct reversal photographic emulsion layer and said dye image-forming material is combined with said direct reversal photographic emulsion layer.

17. The photographic element of claim 13, wherein said photographic emulsion is a direct reversal photographic emulsion.

18. The photographic element of claim 17, wherein said direct reversal photographic emulsion is an internal latent image type direct reversal photographic emulsion.

19. The photographic element of claim 18, wherein the internal latent image type emulsion is an internal latent image type emulsion comprising a core and a shell.

20. The photographic element of claim 1, wherein said neutralizing system has a $T_{15}/T_{25}$ value of from about 2.5 to 6.0, wherein $T_{15}$ is the time required for reducing the pH of the alkaline processing solution to 10 at 15° C. and $T_{25}$ is the time required for reducing the pH of the alkaline processing solution to 10 at 25° C.

21. The photographic element of claim 20, wherein said value is about 3.0 to 5.0.

22. The photographic element of claim 1, wherein said monomer of Group (B) is styrene.

23. The photographic element of claim 1, wherein said monomer of Group (B) is butyl acrylate.

24. The photographic element of claim 1, wherein said monomer of Group (B) is butyl methacrylate.

25. The photographic element of claim 1, wherein said monomer of Group (A) is a monomer having a carboxylic acid group.

26. The photographic element of claim 25, wherein said monomer is acrylic acid.

27. The photographic element of claim 25, wherein said monomer is itaconic acid.

28. The photographic element of claim 1, wherein said monomer of Group (B) is vinylidene chloride.

29. The photographic element of claim 1, wherein said monomer of Group (B) is acrylonitrile.

30. The photographic element of claim 1, wherein said monomer of Group (B) is methyl acrylate.

31. The photographic element of claim 1, wherein said monomer of Group (B) is methyl methacrylate.

32. The photographic element of claim 1, wherein said monomer of Group (C) is glycidyl acrylate.

33. The photographic element of claim 1, wherein said monomer of Group (C) is glycidyl methacrylate.

* * * * *